Oct. 8, 1929. J. LORD 1,731,144
HIDE STRETCHER
Filed Nov. 14, 1927  2 Sheets-Sheet 1
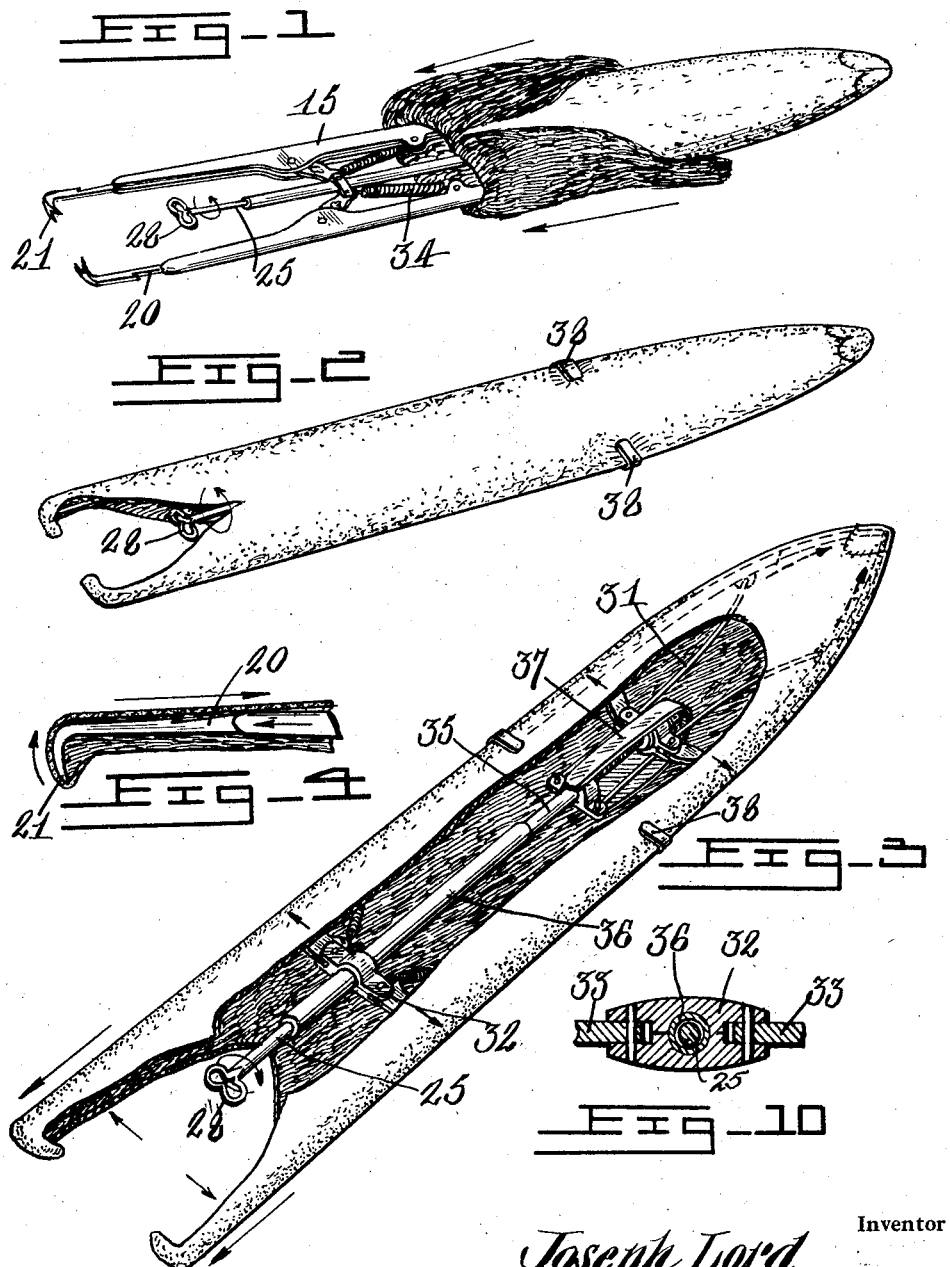
Inventor
Joseph Lord
By Marion & Marion
Attorneys

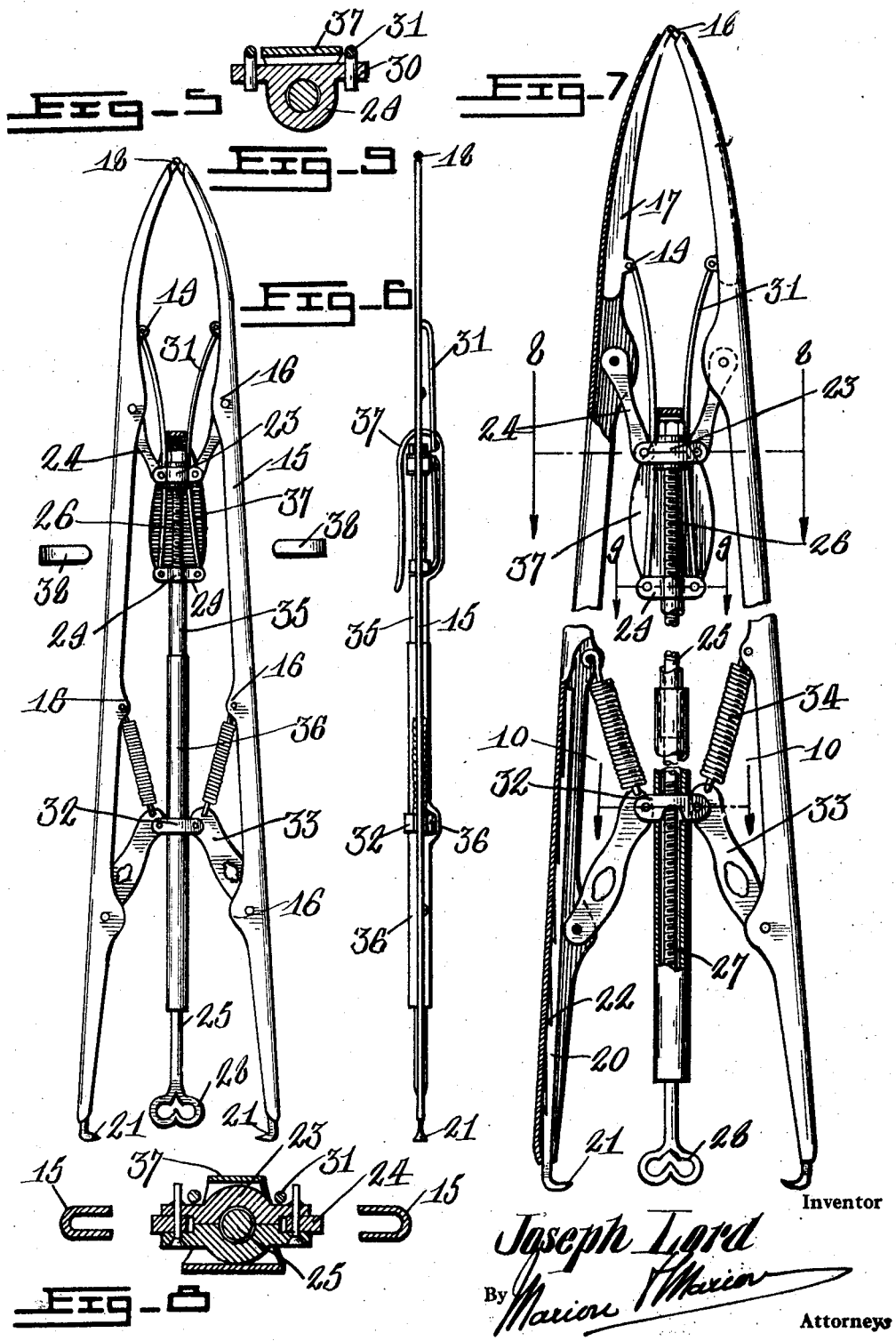

Patented Oct. 8, 1929

1,731,144

UNITED STATES PATENT OFFICE

JOSEPH LORD, OF TASCHEREAU, QUEBEC, CANADA

HIDE STRETCHER

Application filed November 14, 1927, Serial No. 233,255, and in Canada September 19, 1927.

The present invention relates to improvements in stretching frames and has particular reference to a frame adapted for stretching animal hides and the like.

An important object of the invention is the provision of a hide stretching frame constructed so that the animal hide can be uniformly stretched throughout its length.

A further object of the invention is the provision of a stretching frame arranged so that animal hides of a particular species can be stretched so as to produce comparative uniformity in the sizes thereof.

Still another object of the invention is the provision of a stretching frame constructed so that the frame will be adjustable to accommodate hides of various sizes.

A still further object of the invention is the provision of a stretching frame which will be efficient in operation and which can be manufactured at a relatively low cost.

Other objects and advantages of the invention will become apparent as the description progresses.

In the accompanying drawing forming a part of this specification and in which like reference characters are employed to designate corresponding parts throughout the same:

Figure 1 is a perspective view of the frame showing a hide partly in position thereon, Figure 2 is a similar view showing the hide completely arranged on the frame, Figure 3 is a similar view showing a portion of the hide cut away to disclose the interior construction of the frame, Figure 4 is a detail elevation of the extensible frame structure, Figure 5 is a plan view of the stretching frame, Figure 6 is a side elevation of the same, Figure 7 is an enlarged fragmentary plan of the frame, partly in section, Figure 8 is an enlarged transverse section taken on the line 8—8 of Figure 7, Figure 9 is a similar view taken on the line 9—9 of Figure 7, and Figure 10 is a similar view taken on the line 10—10 of Figure 7.

Referring to the drawings, wherein for the purpose of illustration is shown a preferred embodiment of the invention, the numeral 15 generally designates the complementary frame sections which are formed of channel shaped metallic bars having one end curved to provide the converging ends of the frame. At intervals, the flanges of the frame sections 15 are provided with inwardly extending apertured ears 16, the purpose of which will be later described. Slidably fitted in the arcuate converging ends of the frame sections are curved tapered bars 17 the outer converging extremities being pivotally connected, as indicated at 18, to provide a pivotal connection for the frame sections. The inner ends of the bars 17 are formed with inwardly extending apertured ears 19. Slidably fitted in the lower diverging ends of the frame sections are longitudinally extensible arms 20 the outer ends being formed with angular inwardly projecting bifurcated claws 21. The outer edges of the arms 20 are formed with angular notches 22 arranged so that the arms may be securely locked in adjusted position.

Supported between the upper converging portions of the frame sections in the intermediate portion of the frame is a transverse bearing 23 the ends being bifurcated for pivoted connection with complementary outwardly projecting arms 24, the outer ends of the arms being pivoted to the apertured ears 16 of the sections.

Extending longitudinally in the intermediate portion of the frame and having its upper end rotatably journaled in the bearing 23 is a threaded operating rod 25, the upper portion preferably being formed with left hand screw threads, as indicated at 26, while the lower portion is formed with right hand threads, as designated at 27. The lower outer end of the rod is formed with a transversely extending operating handle 28.

Fitted upon the upper threaded end of the rod 25 and threadedly engageable therewith, for longitudinal adjustment, is a collar 29 provided with transversely extending apertured extensions 30 adapted to engage the lower angularly bent ends of resilient operating rods 31. The opposed ends of the rods 31 are pivotally connected with the ears 19 of the bars 17 so that rotatable operation of the operating rod 25 will slidably actuate the bars 17 in the converging ends of the frame sections.

Positioned about the lower threaded end of the rod 25 and engageable with the right hand threads formed thereon is a lower collar 32 formed with bifurcated extensions adapted to pivotally engage the inner ends of arm 33 whose outer ends are pivotally connected with ears 16 formed adjacent the outer extended portions of the frame sections. Upon rotation of the operating rod 25, the collar 32 will be longitudinally actuated to extend or contract the complementary arms 33 to correspondingly adjust the width of the frame. The collar 32 and arms 33 pivotally connected thereto are normally urged to a contracted position by means of coiled tension springs 34 attached to the inner ends of the arms and the ears 16 formed at the intermediate portions of the frame sections.

In order to completely cover the threaded portion of the operating rod 25 and prevent injury to the hide during the stretching operation, the rod is enclosed in a suitable housing embodying a tubular section 35 positioned about the intermediate portion of the actuating rod 25 and a complementary section 36 of increased diameter covering the lower portion of the rod and adapted to telescopically fit over the inner section 35 so as to completely cover the rod when the adjustable bearings are extended. The upper portion of the rod, between the collar 29 and the bearing 23, is covered by a casing 37 doubled over the upper end of the rod.

In use, the frame is initially contracted by rotation of the operating rod 25 so as to actuate the threaded collars 29 and 32 to contracted adjacent positions causing the frame sections 15 to be adjusted inwardly. The animal hide is then positioned over the frame and the operating rod 25 rotated in opposite direction so as to actuate the collars in opposite directions thereby causing outward movement of the rods 31 and arms 33 to uniformly separate the frame sections. The rods 31 will tend to expand the upper converging ends of the sections upon application of the operating rod when the arms are longitudinally actuated in the frame sections. The lower open portion of the frame is adjusted by the angular movement of the arms 33 tending to separate or contract the lower portions of the frame sections upon longitudinal movement of the collar 32.

In order to properly maintain the hide in position on the frame, it is firmly secured thereon by means of U-shaped resilient clips 38 adapted to be fastened over the outside edges of the hide and frame sections, as clearly shown in Figures 2 and 3. When the hide is longer than the longitudinal extension of the frame sections, the arms 20 may be longitudinally extended to compensate for the exterior extension of the hide so that animal hides of various sizes may be efficiently stretched upon the frame.

From the foregoing description, it will be apparent that the frame structure is designed to uniformly stretch the hide throughout its length, lengthwise as well as transversely and properly stretch the same. In this manner, hides of similar species may be stretched to conform to a substantially similar size so as to produce substantial regularity therein.

It is to be understood that the form of my invention herein shown and described is to be taken as a preferred example of the same, and that various changes as to the shape, size, and arrangement of parts may be resorted to without departing from the spirit of the invention or the scope of the subjoined claims.

Having thus described my invention, I claim:—

1. A pelt stretcher comprising opposed pivoted frame sections, means mounted in one end of the frame sections for varying the longitudinal extension of the latter, and means connected to said frame sections for uniformly moving the same in relation to each other.

2. A pelt stretcher comprising a laterally adjustable frame consisting of opposed diverging sections, and means mounted in the diverging portion of the frame for selectively adjusting the longitudinal form of the frame including a pair of arms mounted for slidable adjustment in the opposed sections of the frame, said arms being formed with a series of notches and adapted for selective projection beyond the end of the frame to form a prolongation thereof.

3. A pelt stretcher comprising opposed frame sections pivoted at one end, a slidable member mounted in the pivoted end of each frame section and adapted with the longitudinal extension thereof to laterally move the frame, means connected to the frame sections for laterally moving the opposite free end portions of the frame sections, and a member adapted to simultaneously actuate the slidable members and frame moving means.

4. A pelt stretcher comprising a frame including a pair of complementary frame sections arranged in diverging positions, a pair of bars slidably fitted in the converging ends of the sections and pivotally connected at their outer ends, a pair of pivoted members connected with the sections and adapted to laterally move the diverging portions thereof, and an operating rod operatively associated with said sliding bars and pivoted members.

In witness whereof I have hereunto set my hand.

JOSEPH LORD.